UNITED STATES PATENT OFFICE.

CHARLES MAYERING, OF ZICHYFALVA, AUSTRIA-HUNGARY.

METHOD OF MANUFACTURING LIQUID LENSES.

No. 807,300. Specification of Letters Patent. Patented Dec. 12, 1905.

Application filed April 18, 1903. Renewed November 13, 1905. Serial No. 287,183.

*To all whom it may concern:*

Be it known that I, CHARLES MAYERING, apothecary, a subject of the Emperor of Austria-Hungary, residing at Zichyfalva, county of Torontal, in the Empire of Austria-Hungary, have invented certain new and useful Improvements in and Relating to the Method of Manufacturing Liquid Lenses; and I do hereby declare the following to be a full, clear, and exact description of the invention, such as will enable others skilled in the art to which it appertains to make and use the same.

Hitherto optical lenses filled with liquid have been constructed in the form of flat flasks and filled through the neck of the flask and then sealed or fused up or else of two pieces of glass, each formed so as to correspond to one-half of the lens and held together by means of clips and wires, a filling-aperture being made either during the formation of the parts or after they have been assembled, this opening being sealed up after the lens has been filled. The employment of a filling-aperture presents the defect that this aperture or its mouthpiece renders it impossible to retain a perfect lens formation and also that owing to the sealing an irregular heating of the lens-casing is produced, whereby the lens may be fractured and suffers in clearness and uniformity. In addition to this there is the difficulty of exactly and completely filling the lens through this aperture in such a manner that no air-bubbles remain in the liquid. The employment of clips and wires or other mechanical devices for holding together the two halves of the lens results in further difficulties. Such devices must be very exactly and well finished, and therefore increase the cost of production, more especially in the case of lenses of large diameter, so that the economy in the cost of production, which is one of the chief reasons for employing liquid lenses for large sizes, is almost completely nullified. In addition to this the mechanical devices do not permit of the formation of permanently-tight lenses if they are adjustably arranged, as owing to their expansibility, which is different from that of glass, they are liable to become loose even after adjustment and while the lenses are in use. Finally, there is imparted to the lenses by the employment of mechanical connections a form which limits their general use.

This invention has for its object a method by means of which the use of filling-aperture, the mechanical connections above referred to, and also the necessity for heating the filled lens are all obviated.

The glass bodies formed so as to correspond to the halves of the lens are in accordance with my invention immersed in the filling liquid, and while so immersed their edges are arranged together, whereupon the loosely-assembled lens, which is completely filled with the liquid, is withdrawn therefrom and the assembled edges coated with a substance to which the character of glass can be imparted in a cold condition. Thickened soluble glass is the most suitable substance for this purpose. A suitable quantity of this substance is spread over the edge of the lens, and after it is dry it is converted into glass by the repeated application of dilute hydrochloric acid. In this manner a most finely and tightly closed liquid lens is obtained which, owing to the method of this manufacture, is free from all the defects enumerated above. In carrying out this method of manufacture in practice it is advantageous to make use of two brushes mounted upon one and the same handle, one of these brushes being kept dry and the other immersed in the water-glass. The edge of the lens lifted from the filling liquid is submitted to the section of these two brushes, the dry brush serving to wipe off the liquid, while the other brush simultaneously applies the water-glass.

Lenses produced in accordance with this invention secure also the advantages obtainable from liquid lenses when the defects mentioned above and which this invention is intended to obviate have been eliminated, and by suitably selecting or composing the filling liquid acromatic lenses of dimensions hitherto unattainable may be produced which are quite equal to ground solid lenses and which are entirely free from cords and air-bubbles and with which the most various focal distances may be inexpensively and simply produced.

I claim—

1. The method of manufacturing lenses which consists in immersing suitably-shaped hollow lens-halves into the liquid to be used for filling the lens, uniting the said lens-halves while under the surface of the said liquid so as to form an entire lens, removing the said entire lens from the liquid, and sealing the edges of said entire lens by means of a suitable cementing substance.

2. The method of manufacturing lenses which consists in immersing suitably-shaped hollow lens-halves into the liquid to be used for filling the lens, uniting the said lens-halves while under the surface of the said liquid so as to form an entire lens, removing the said entire lens from the liquid, sealing the edges of said entire lens by means of water-glass, drying the said sealing means, and treating it with hydrochloric acid so as to harden the same.

In testimony that I claim the foregoing as my invention I have signed my name in presence of two subscribing witnesses.

CHARLES MAYERING.

Witnesses:
JULES KORMOS,
JOHN GERZUTZO.